H. CLARK.
ELECTRICAL WATER PURIFYING APPLIANCE.
APPLICATION FILED JULY 14, 1915.
1,163,321.
Patented Dec. 7, 1915.
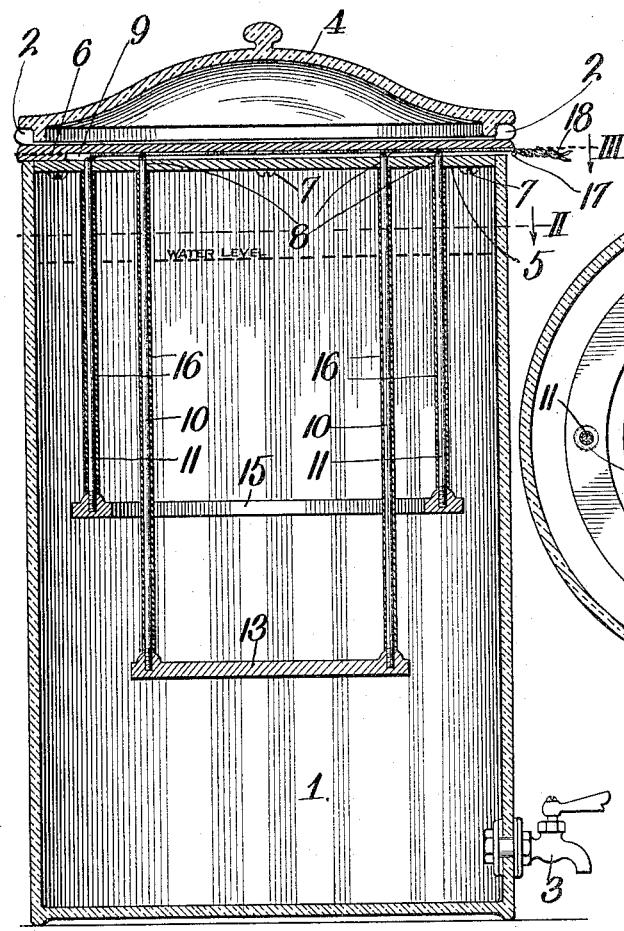
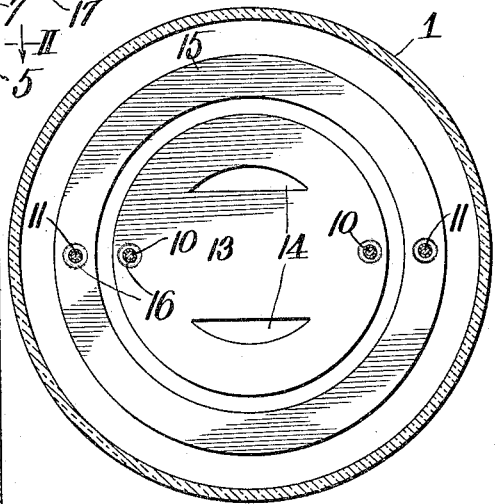
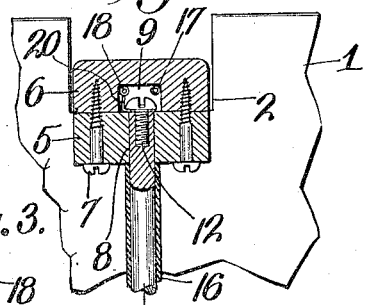
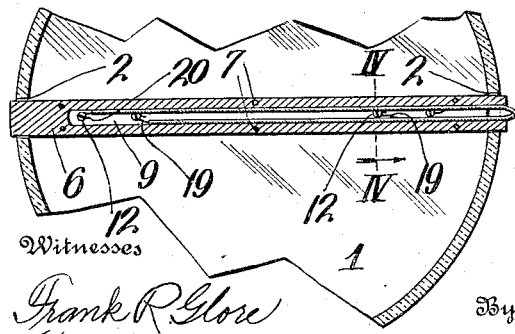
Inventor
Has Clark
Witnesses
Frank R Glore
K. M. Thorpe
By George Y Thorpe
Attorney

UNITED STATES PATENT OFFICE.

HAS CLARK, OF KANSAS CITY, MISSOURI, ASSIGNOR OF TWO-THIRDS TO JOHN R. GREEN, OF OKLAHOMA, OKLAHOMA, AND THOMAS T. BATHURST, OF KANSAS CITY, MISSOURI.

ELECTRICAL WATER-PURIFYING APPLIANCE.

1,163,321. Specification of Letters Patent. Patented Dec. 7, 1915.

Application filed July 14, 1915. Serial No. 39,804.

*To all whom it may concern:*

Be it known that I, HAS CLARK, a citizen of the United States, residing at Kansas City, in the county of Jackson and State of Missouri, have invented certain new and useful Improvements in Electrical Water-Purifying Appliances, of which the following is a specification.

This invention relates to electrical water purifying appliances, and my object is to produce an efficient appliance for the economic purification of water for household or family use or wherever the demand for such water is light.

A further object is to produce a simple, durable and inexpensive portable water purifier which can be easily and quickly cleaned; which can be set in operation or rendered inoperative by simply closing or opening a switch, and which is of ornamental appearance.

With these objects in view the invention consists in certain novel and peculiar features of construction and combinations of parts as hereinafter described and claimed; and in order that it may be fully understood reference is to be had to the accompanying drawing, in which:

Figure 1, is a central vertical section of a water purifying appliance embodying my invention. Fig. 2, is a horizontal section on the dotted line II, of Fig. 1. Fig. 3, is a horizontal section on the dotted line III, of Fig. 1. Fig. 4, is an enlarged vertical section on line IV—IV, of Fig. 3.

Referring to the drawing in detail, 1 is a cylindrical vessel or jar, preferably of glass, provided with diametrically opposite notches 2 in its upper edge, and with a draw-off faucet 3 near its lower end or bottom, a cover 4 resting upon the vessel and bridging the notches thereof. A support or bridge, of insulation material preferably, consists of a pair of superposed bars 5 and 6, secured together by suitable fastening devices, such as screws 7, the lower bar 5 fitting within the vessel and the upper bar 6 projecting beyond the ends of the lower bar and fitting in the notches of the vessel. The lower bar is provided with a plurality of vertical holes 8, communicating with a channel or groove 9 in the under-side of bar 6, which channel or groove extends at one end to the corresponding end of said bar 6.

10 is a pair of rods of conducting material, fitting at their upper ends in the innermost pair of openings 8 and extending about two-thirds of the way to the bottom of the vessel. A second pair of similar but shorter rods 11, fit at their upper ends in the outer pair of openings 8. All of the rods are preferably provided at their upper ends with detachable heads in the form of screw-bolts 12, the heads of which overlap the bar 5 around the openings or holes therein, to prevent the rods from dropping down within the vessel. An electrode 13, of disk-like form is supported by the rods 10, and said electrode is preferably provided with openings 14 to facilitate the circulation of water within the vessel.

15 is an electrode of ring-shape and substantially larger than the electrode 13, both electrodes being disposed concentrically with respect to the axis of the vessel, and said electrode 15 is supported by the rods 11. In this connection it will be noticed that a screw driver engaged with the detachable head of a rod is a convenient tool for screwing the rod into the proper electrode.

All of the rods are provided with a waterproof insulation sheath 16, and extending into the channel or groove 9 of the support or bridge, is a pair of insulated wires 17 and 18, the former having branches 19 clamped to the upper ends of rods 10 by the detachable heads thereof, and wire 18 having branches 20 clamped to the upper ends of rods 11 by the detachable heads thereof.

To purify water standing in the vessel, as indicated by the dotted waterline, in Fig. 1, a cord plug, not shown, on wires 17 and 18, is screwed into a wall or lamp socket, not shown, and the switch of such socket is operated to close the circuit through the socket. As this is done the circuit is completed by the current flowing through the water from one electrode to the other, the passage of the current setting up an electrolytic action in the water and causing the same to effervesce in a very noticeable manner. The electrodes are so placed that the entire body of water is quickly brought within the influence of and purified by the current of electricity, the rapidity of the purification of course depending upon the strength and amperage of the current. After about an hour with a current of say one hundred and ten volts, the socket switch is opened, and then the heavy impurities and sediment set free in the water by the electrolytic action, settle to the bottom of the vessel, after which purified water can be drawn off through the faucet. Such gases as are liberated through the decomposition of water escape from the vessel through the notches in the upper end thereof.

From the above description it will be apparent that I have produced a water purifying appliance embodying the features of advantage enumerated as desirable in the statement of the object of the invention, and while I have illustrated and described the preferred embodiment of the invention it is to be understood that I reserve the right to make such changes as properly fall within the spirit and scope of the appended claims.

I claim:

1. A water purifier, comprising a vessel, a draw off faucet therefor, a pair of electrodes submerged in water in the vessel at different levels, a cover for the vessel, a support or bridge supported on the vessel below the cover and provided with a channel opening at one end exterior to the vessel, insulated conductors depending from the said support and supporting and electrically connected to the electrodes, and electric wires extending into the channel of the support and connected respectively to said electrodes.

2. A water purifier, comprising a vessel, a draw off faucet therefor, a disk-like electrode and a ring-shaped electrode submerged at different levels in the water in the vessel, the ring-shaped electrode occupying a higher plane than the other electrode, a support or bridge on the vessel, a pair of insulated rods depending from the support through the space within the ring-shaped electrode and supporting and electrically connected to the disk-like electrode, a second pair of insulated rods extending from the support and supporting and electrically connected to the ring-shaped electrode, an electric wire extending into the support and connected to the first-named pair of rods, a second electric wire extending into the support and electrically connected to the other pair of rods, and a cover fitting on the vessel above said support.

In testimony whereof, I affix my signature, in the presence of two witnesses.

HAS CLARK.

Witnesses:
 DENIS J. DOWNEY,
 G. Y. THORPE.

Copies of this patent may be obtained for five cents each, by addressing the "Commissioner of Patents, Washington, D. C."